United States Patent
Ohashi (10) Patent No.: US 7,152,208 B2
(45) Date of Patent: Dec. 19, 2006

(54) APPARATUS MANAGING DOCUMENT DISTRIBUTION

(75) Inventor: Tadashi Ohashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/222,833

(22) Filed: Dec. 30, 1998

(65) Prior Publication Data
US 2001/0042077 A1   Nov. 15, 2001

(30) Foreign Application Priority Data
Jul. 24, 1998   (JP) ................. 10-209584

(51) Int. Cl.
G06F 15/00 (2006.01)
(52) U.S. Cl. .................... 715/530; 715/500
(58) Field of Classification Search ............. 707/500, 707/6, 10, 509, 200, 505, 530; 715/530, 715/500, 531; 709/203
See application file for complete search history.

(56) References Cited

U.S. PATENT DOCUMENTS

| | | | | |
|---|---|---|---|---|
| 5,181,162 A * | 1/1993 | Smith et al. | ............. | 707/104.1 |
| 5,247,661 A * | 9/1993 | Hager et al. | ............. | 707/104.1 |
| 5,249,268 A * | 9/1993 | Doucet | ............. | 709/230 |
| 5,481,294 A * | 1/1996 | Thomas et al. | ............. | 725/20 |
| 5,504,676 A * | 4/1996 | Domen et al. | ............. | 707/10 |
| 5,553,289 A * | 9/1996 | Johnson et al. | ............. | 345/705 |
| 5,678,045 A * | 10/1997 | Bettels | ............. | 707/200 |
| 5,689,625 A * | 11/1997 | Austin et al. | ............. | 358/1.13 |
| 5,724,556 A * | 3/1998 | Souder et al. | ............. | 703/2 |
| 5,749,083 A * | 5/1998 | Koda et al. | ............. | 715/530 |
| 5,754,766 A * | 5/1998 | Shaw et al. | ............. | 709/200 |
| 5,765,167 A * | 6/1998 | Kiuchi et al. | ............. | 707/200 |
| 5,787,262 A * | 7/1998 | Shakib et al. | ............. | 709/205 |
| 5,819,295 A * | 10/1998 | Nakagawa et al. | ............. | 707/203 |
| 5,829,003 A * | 10/1998 | Okura | ............. | 707/100 |
| 5,832,497 A * | 11/1998 | Taylor | ............. | 707/104 |
| 5,870,761 A * | 2/1999 | Demers et al. | ............. | 707/201 |
| 5,875,441 A * | 2/1999 | Nakatsuyama | ............. | 707/1 |
| 5,878,398 A * | 3/1999 | Tokuda et al. | ............. | 705/8 |
| 5,893,114 A * | 4/1999 | Hashimoto et al. | ............. | 707/200 |
| 5,970,476 A * | 10/1999 | Fahey | ............. | 705/28 |
| 6,006,248 A * | 12/1999 | Nagae | ............. | 709/105 |
| 6,014,677 A * | 1/2000 | Hayashi et al. | ............. | 707/501 |
| 6,119,122 A * | 9/2000 | Bunnell | ............. | 707/102 |
| 6,144,948 A * | 11/2000 | Walker et al. | ............. | 705/10 |
| 6,192,407 B1* | 2/2001 | Smith et al. | ............. | 709/229 |
| 6,208,998 B1* | 3/2001 | Marcus | ............. | 707/104.1 |
| 6,240,414 B1* | 5/2001 | Beizer et al. | ............. | 707/8 |
| 6,243,755 B1* | 6/2001 | Takagi et al. | ............. | 709/229 |
| 6,256,668 B1* | 7/2001 | Slivka et al. | ............. | 709/220 |

(Continued)

FOREIGN PATENT DOCUMENTS

| | | |
|---|---|---|
| JP | 7-319921 | 12/1995 |
| JP | 8-16757 | 1/1996 |

OTHER PUBLICATIONS

Sanz et al., Gathering Metadata from Web-based Repositories of Historical Publications, IEEE, Aug. 1998, pp. 473-478.*

(Continued)

*Primary Examiner*—Cong-Lac Huynh
(74) *Attorney, Agent, or Firm*—Staas & Halsey LLP (57) ABSTRACT

A document management apparatus having a constitution for periodically checking whether the attribute information in a document managed by a user conflicts with master information of the attribute information managed by a Personnel server or Enterprise-Department servers or not, and changing the attribute information in the document to the attribute information in the servers when both of the information conflict with each other.

1 Claim, 11 Drawing Sheets

U.S. PATENT DOCUMENTS

| | | | | |
|---|---|---|---|---|
| 6,266,703 B1 | * | 7/2001 | Clark et al. | 709/237 |
| 6,301,612 B1 | * | 10/2001 | Selitrennikoff et al. | 709/220 |
| 6,308,179 B1 | * | 10/2001 | Petersen et al. | 707/10 |
| 6,327,618 B1 | * | 12/2001 | Ahlstrom et al. | 709/223 |
| 6,330,573 B1 | * | 12/2001 | Salisbury et al. | 707/203 |
| 6,332,160 B1 | * | 12/2001 | Tabuchi | 709/224 |
| 6,341,305 B1 | * | 1/2002 | Wolfe | 709/203 |
| 6,366,918 B1 | * | 4/2002 | Guttman et al. | 707/100 |
| 6,377,540 B1 | * | 4/2002 | Hogberg et al. | 370/216 |
| 6,405,243 B1 | * | 6/2002 | Nielsen | 709/206 |
| 6,452,688 B1 | * | 9/2002 | Suzuki | 358/1.15 |
| 6,523,044 B1 | * | 2/2003 | Muramoto et al. | 707/103 Y |
| 6,735,701 B1 | * | 5/2004 | Jacobson | 726/1 |
| 7,028,032 B1 | * | 4/2006 | Diedrich et al. | 707/10 |
| 2002/0100803 A1 | * | 8/2002 | Sehr | 235/384 |

OTHER PUBLICATIONS

Staniford et al., Cooperative Dialogues with the Support Of Autonomous Agents, IEEE, May 1993, pp. 144-151.*

Candan et al., CHIMP : A framework for supporting distributed multimedia document authoring and presentation, ACM 1996, pp. 329-340.*

* cited by examiner

| ITEM NUMBER | CORPORATE ORGANIZATION CODE | CORPORATE ORGANIZATION NAME | REGION | PERSON IN CHARGE | COPIES | REMARKS |
|---|---|---|---|---|---|---|
| 0001 | 1432 | INFORMATION SYSTEM DEPARTMENT | KAWASAKI | TADASHI OHASHI | 1 | |
| 0002 | | | MINAMITAMA | | 2 | |
| 0003 | | | NUMAZU | | 2 | |

| ITEM NUMBER | CORPORATE ORGANIZATION CODE | CORPORATE ORGANIZATION NAME | REGION | PERSON IN CHARGE | COPIES |
|---|---|---|---|---|---|
| 0001 | 1432 | INFORMATION SYSTEM DEPARTMENT | KAWASAKI | TADASHI OHASHI | 1 |
| 0002 | | | MINAMITAMA | | 2 |
| 0003 | | | NUMAZU | | 2 |

APPARATUS MANAGING DOCUMENT DISTRIBUTION

FIELD OF THE INVENTION

The present invention relates to a document management apparatus used for managing, for example, distribution targets of objects for distribution such as drawings or documents in the manufacturing industry and to a computer-readable medium with a computer program recorded thereon for causing a computer function as the document management apparatus.

BACKGROUND OF THE INVENTION

In recent years, it has been growing in various fields to store and manage various types of information by a computer as electronic documents. For example, in the manufacturing industry, objects for distribution are managed as electronic documents and also information for distribution targets of each object for distribution is managed as electronic documents (expressed as a distribution-target management table hereinafter) each having contents as shown in FIG. 12.

Figure 12:
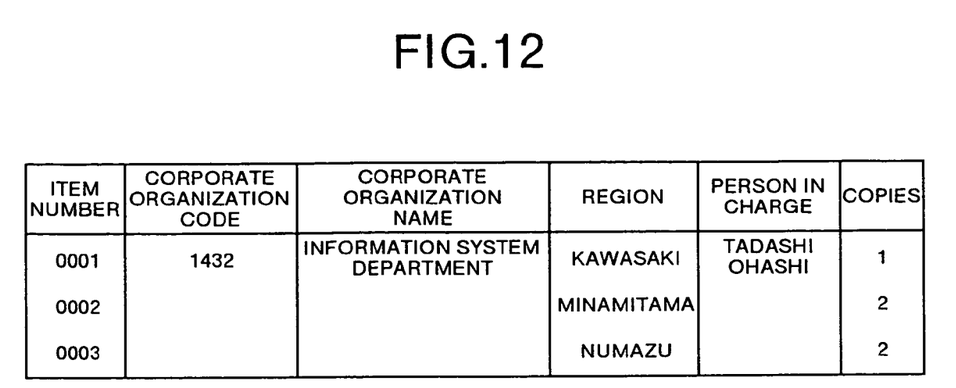
FIG. 12 is an explanatory view showing a distribution-target management table based on the conventional technology.

As well known, there are various types of information managed by a computer, and a document represented by the distribution-target management table shown in FIG. 12 includes attribute information such as a corporate organization name and a corporate organization code in which master information of the document may be managed by some other information processing unit. The corporate organization names are names of units constituting the organization to which an object for distribution belongs (in short, to which an object for distribution is to be distributed), and each corporate organization code is an information obtained by encoding a corporate organization name consisting of Chinese or other characters so as to easily handle the name by a computer.

Namely, the document like the distribution-target management table is required to be changed, when a corporate organization or so is changed, the contents in accordance with its change, while the information for the corporate organization or so may, in many cases, actually be managed by completely different information processing unit. However, in a device based on the conventional technology for managing documents such as the distribution-target management tables (e.g., technology disclosed in Japanese Patent Laid-Open Publication No. HEI 7-319921 or Japanese Patent Laid-Open Publication No. HEI 8-16757), a case where attribute information may be changed by some other information processing unit has not been considered.

Therefore, when a distribution target of an object for distribution is specified according to the distribution-target management table of the object for distribution managed by the conventional type of device, there has often occurred cases where the distribution target is no more in-charge of the object for distribution or where the distribution target itself does not exist.

SUMMARY OF THE INVENTION

It is an object of the present invention to provide, for solving the problems described above, a document management apparatus in which master information of a plurality types of attribute information included in a document managed by a user is stored in other information processing unit, and in which the contents of the document managed by the user can be matched, when the master information is changed, to the master information after its change, as well as a computer-readable recording medium with a computer program recorded therein for causing a computer function as the document management apparatus.

With the present invention, when master information is changed, contents of a document managed by a user can automatically be matched with the changed master information. Therefore, documents can more accurately be managed by using this document management apparatus.

With the present invention, a document including corporate organization codes as well as corporate organization names as attribute information for managing distribution targets of a document as an object for distribution is determined as an object for management, and information including one with corporate organization codes and corporate organization names correlated to each other is determined as master information. In this case, however, as a determination section, there is employed a unit for determining that a relation between attribute information included in a document conflicts with master information in a case where the corporate organization codes included in the document are stored in the master information but a combination of the corporate organization codes with the corporate organization names is not stored therein, and also in a case where the corporate organization names included in the document are stored in the master information but a combination of the corporate organization codes with the corporate organization names is not stored therein; and as a rewriting section, there is employed a unit for rewriting corporate organization names in a document when it is determined by the determination section that a relation between attribute information included in the document conflicts with the master information because the corporate organization codes included in the document are stored in the master information but a combination of the corporate organization codes with the corporate organization names is not stored therein, and for rewriting corporate organization codes in a document when it is determined by the determination section that a relation between attribute information included in the document conflicts with the master information because the corporate organization names included in the document are stored in the master information but a combination of the corporate organization codes with the corporate organization names is not stored therein.

With the present invention, this document management apparatus is further used for handling a document as an object for distribution correlated to job information, and also can be used in a state of that a second information management device for maintaining second master information in which a corporate organization code or a corporate organization name can be retrieved from job information is connected to a communication network. The document management apparatus having the configuration described above is applicable to a generally used system with various information distributed to and managed by a Personnel server as well as by Enterprise-Department servers.

With the present invention, there is added an electronic mail outputting section for outputting an electronic mail when a document is to be rewritten to the Department identified by the attribute information included in the rewritten document, to notify that the attribute information in the document is to be changed. By adding this section, it is possible to obtain a document management apparatus enabling notification to the corresponding Department that the attribute information in the document has been corrected. If the electronic mail outputting section is added as described above and also it is programmed to correct a document only when, for instance, acknowledgement to the transmitted electronic mail comes back, it is possible to obtain a document management apparatus enabling more accurate management of documents.

With the present invention, the document management apparatus according to the present invention can be realized not only as a dedicated device but also can be realized by installing a specified computer program into a computer through a program recorded medium.

Other objects and features of this invention will become apparent from the following description with reference to the accompanying drawings.

DESCRIPTION OF THE PREFERRED EMBODIMENTS

Detailed description is made hereinafter for preferred embodiments of the document management apparatus as well as of the computer-readable recording medium with a computer program recorded therein for causing a computer function as the document management apparatus according to the present invention with reference to an object for distribution such as drawings.

Figure 1:
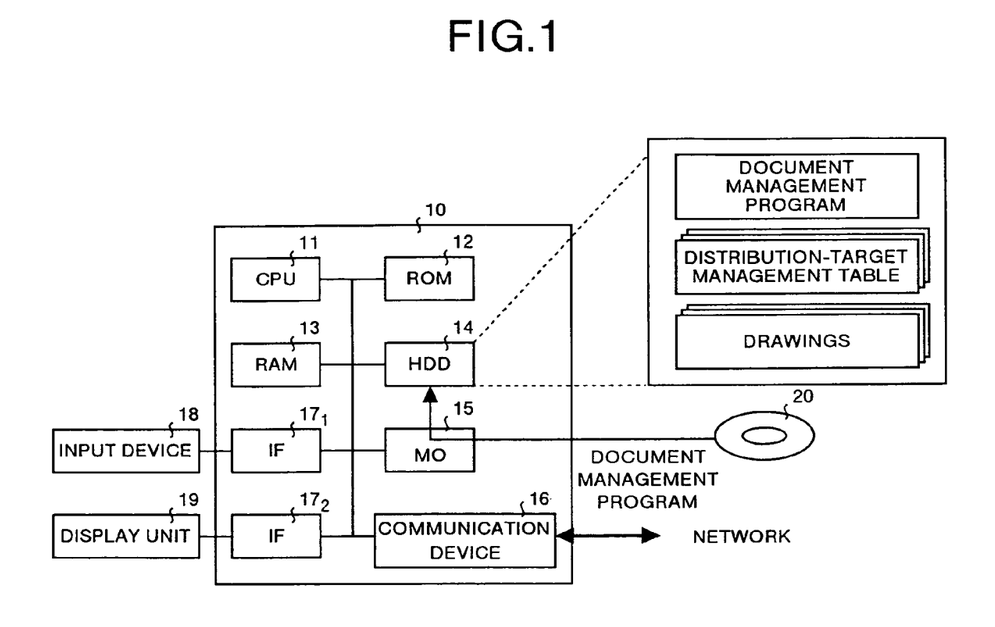
FIG. 1 is a block diagram showing general configuration of a document management apparatus according to an embodiment of the present invention.

FIG. 1 shows configuration of a document management apparatus according to an embodiment of the present invention. As shown in the figure, the document management apparatus 10 is realized by installing a document management program prepared for the apparatus into a computer comprising a CPU 11, a ROM 12, a RAM 13, a hard disk drive (HDD) 14, an MO (Magneto-Optical) disk drive 15, a communication device 16, an interface circuits (IF) $17_1$, $17_2$, an input device 18, and a display unit 19. Namely, in this embodiment, a computer is operated as the document management apparatus 10 by making the CPU 11 provide controls over the sections according to the document management program read out from a MO disk 20 using the MO disk drive 15 and stored in the HDD 14.

The document management apparatus 10 according to the embodiment is an apparatus for managing objects for distribution as well as managing distribution-target management tables each comprising information for a distribution target of an object for distribution, and as schematically shown in the figure, drawings as a plurality of objects for distribution and a plurality of distribution-target management tables are stored in the HDD 14 thereof.

Figure 2:
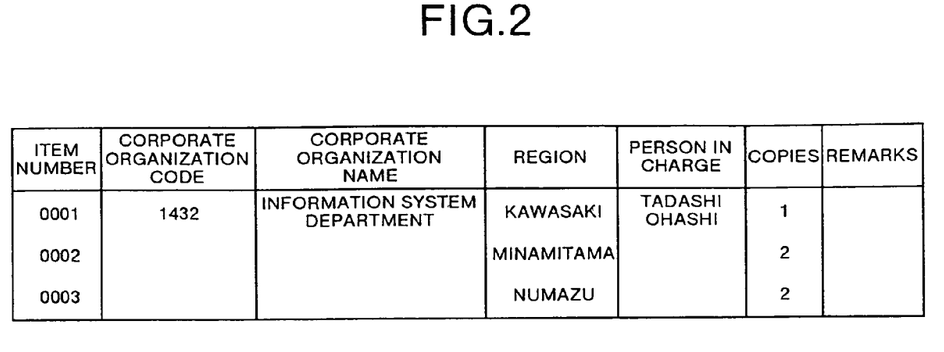
FIG. 2 is an explanatory view showing a distribution-target management table maintained by the document management apparatus according to the embodiment.

FIG. 2 shows configuration of the distribution-target management table. As shown in the figure, the distribution-target management table stores therein information such as Item Number, Corporate organization Code, Corporate organization Name, Region, Person-in-Charge, Copies to be Distributed, and Remarks. The corporate organization names are the names of units constituting an organization (names of Departments) in which the apparatus is used, and the corporate organization code is an information for coded corporate organization name. Furthermore, the distribution-target management table is prepared for each drawing as an object for distribution and stored in the HDD 14.

Figure 3:
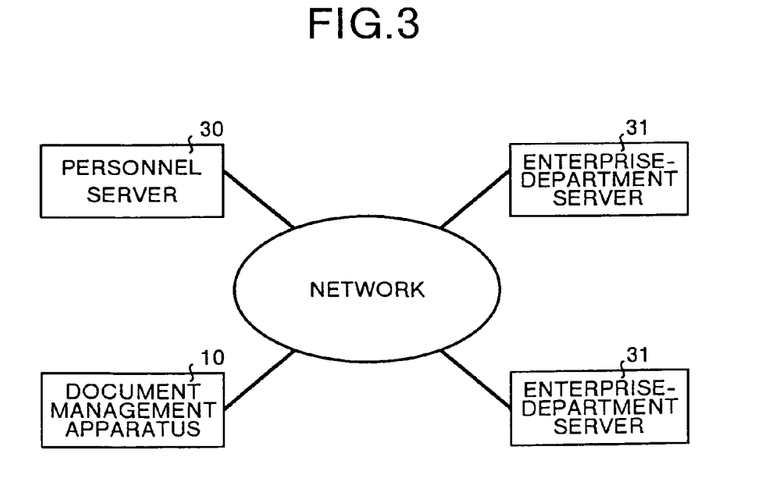
FIG. 3 is a view showing a document management system constructed by using the document management apparatus according to the embodiment.

The document management apparatus 10 is used, as shown in FIG. 3, by connecting to one unit of Personnel server 30 and several units of Enterprise-Department servers 31 through a network. A system as shown in the figure with the document management apparatus 10, Personnel server 30, and more than one units of Enterprise-Department server 31 connected to each other through a network is expressed as document management system hereinafter.

The document management apparatus 10 and the Personnel server 30 as well as the Enterprise-Department servers 31 according to the embodiment used for constituting the document management system are WWW (World Wide Web) servers.

Figure 4:
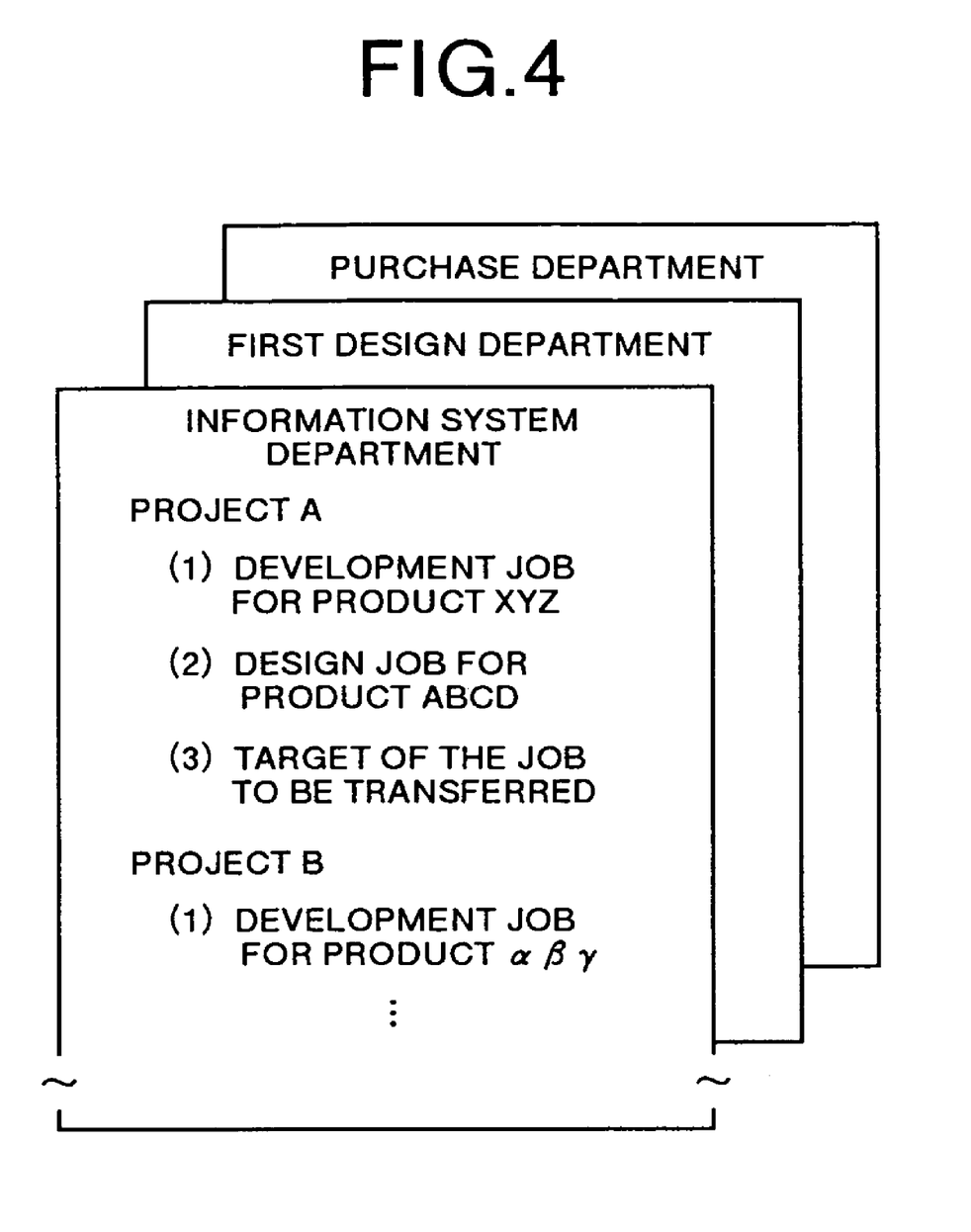
FIG. 4 is an explanatory view showing information managed by an Enterprise-Department server connected to the document management apparatus according to the embodiment through a network.
Figure 5:
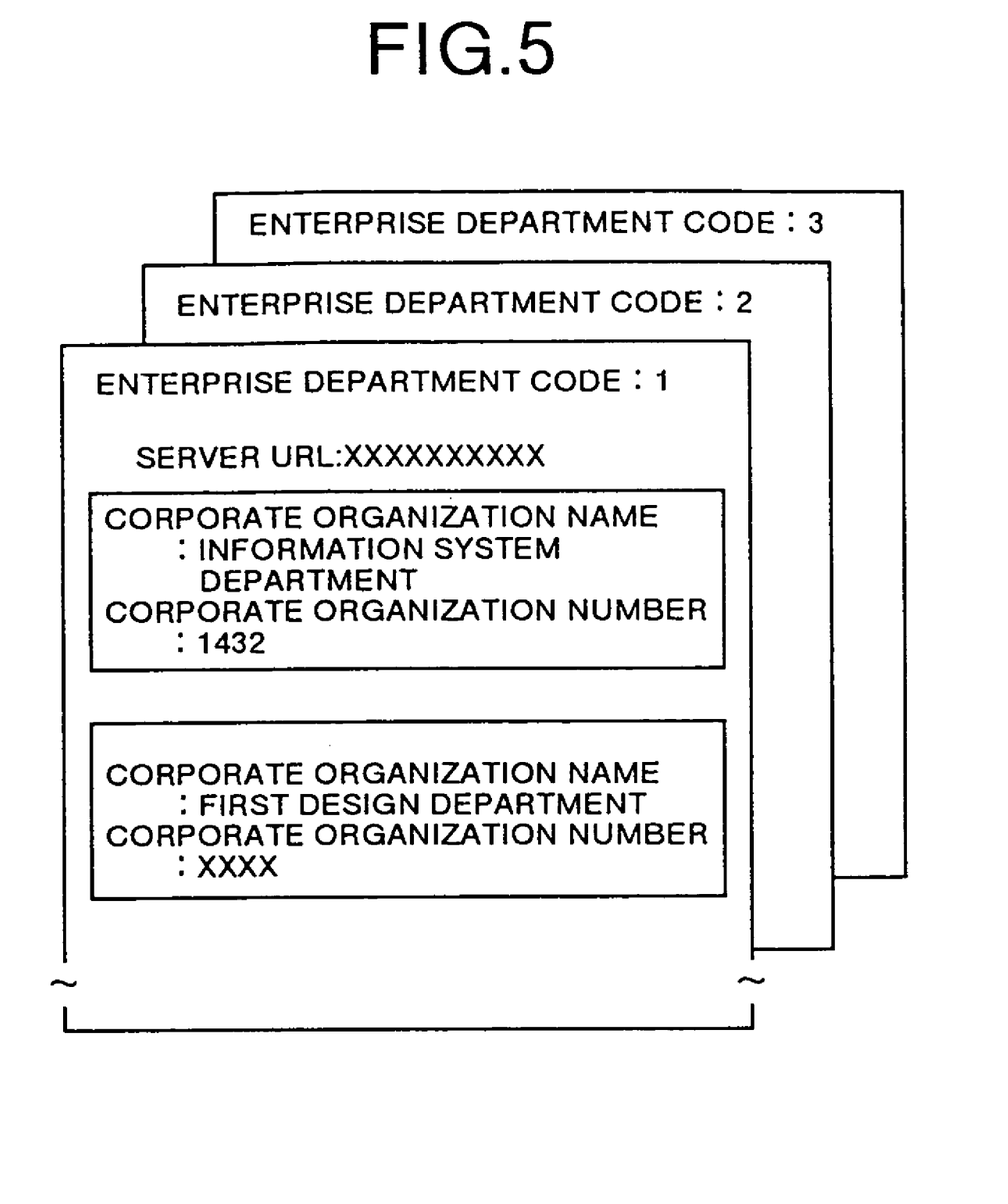
FIG. 5 is an explanatory view showing information managed by a Personnel server connected to the document management apparatus according to the embodiment through a network.

As each of the Enterprise-Department servers 31, there is used a WWW server in which job-contents information on each of a plurality of Departments (corporate organization) managed by the Enterprise-Department server 31 is stored as schematically shown in FIG. 4. Furthermore, as the Personnel server 30, there is used a WWW server in which tables, for each of a plurality of Enterprise-Department codes, on URL (Uniform Resource Locator) of the Enterprise-Department server 31 identified by its Enterprise-Department code as well as on each of the Departments with job-contents information stored in the corresponding Enterprise-Department server 31 and with corporate organization names and corporate organization codes assigned to each of the Departments included therein are stored as schematically shown in FIG. 5.

Detail description is made hereinafter for the processing of checking a distribution-target management table which is the processing executed by the CPU 11 according to the document management program with reference to the flow charts shown in FIGS. 6 to 8, 10 and 11. This processing of checking a distribution-target management table is executed at a prespecified cycle (e.g., every month) although the description thereof is omitted in the flow charts.

Figure 6:
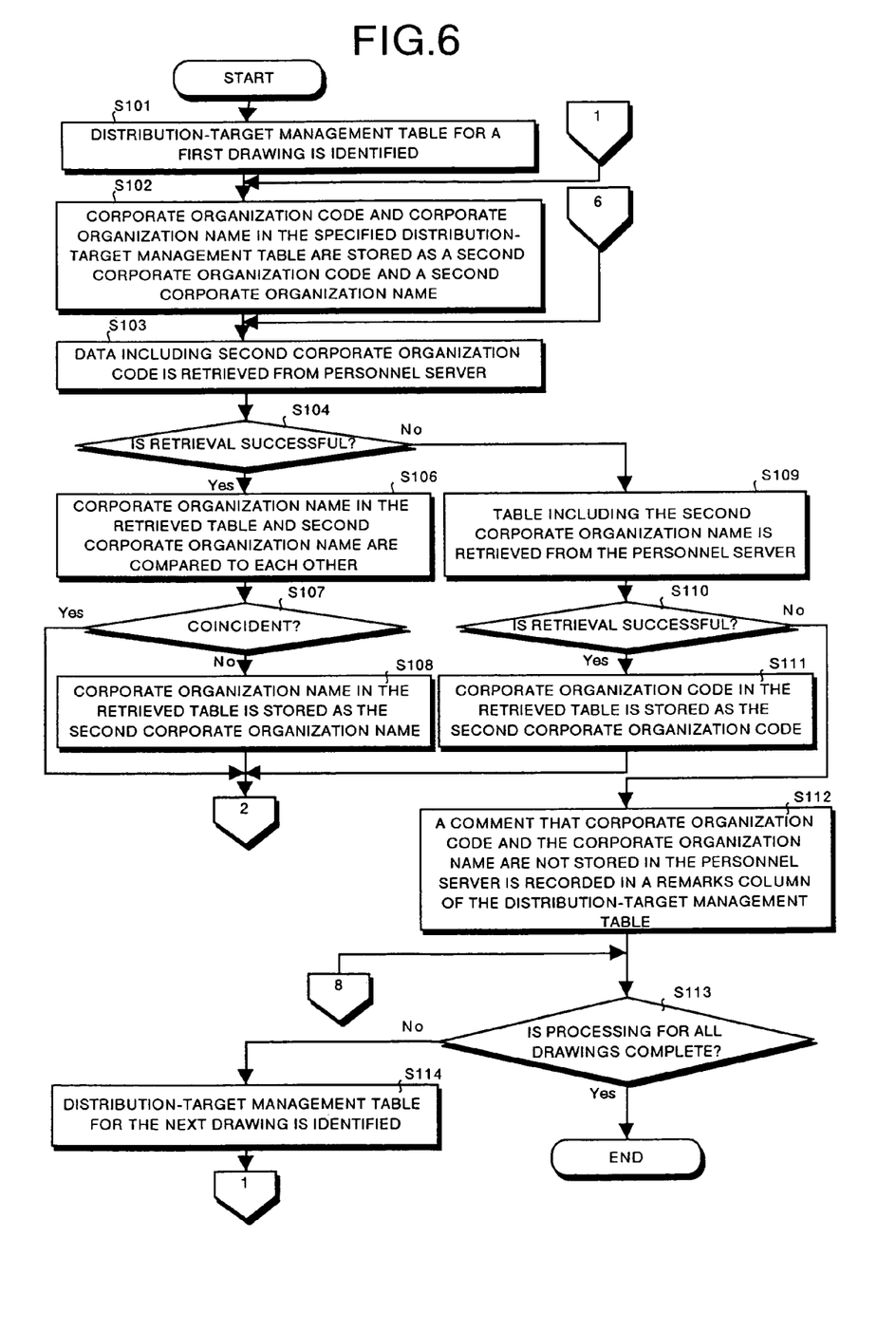
FIG. 6 is a flow chart showing the processing of checking the distribution-target management table executed in the document management apparatus according to the embodiment.

As shown in FIG. 6, at the time of executing the processing of checking a distribution-target management table, the CPU 11 in the document management apparatus 10 first specifies a distribution-target management table on a first drawing (step S101). Then, the CPU 11 acquires a corporate organization code and a corporate organization name from the distribution-target management table, and stores the information in the RAM 13 as a second corporate organization code and a second corporate organization name respectively (step S102). Then, the CPU 11 retrieves a table in which the corporate organization code coincides with the second corporate organization code from the Personnel server 30 (Refer to FIG. 5) by controlling the communication unit 16 or the like (step S103).

When the retrieval of the target table is successful (step S104; YES), the CPU 11 compares a corporate organization name in the retrieved table to the second corporate organization name (step S106), and when it is determined that both of the names are not coincident with each other (step S107; NO), the corporate organization name stored in the table retrieved from the Personnel server 30 is stored as the second corporate organization name (step S108).

On the other hand, when it is determined that there is no table in which the corporate organization code coincides with the second corporate organization code in the Personnel server 30 (step S104; NO), the CPU 11 retrieves a table in which the corporate organization name coincides with the second corporate organization name from the Personnel server 30 (step S109). Then, when this retrieval of the table is successful (step S110; YES), the corporate organization code in the table is stored as the second corporate organization code (step S111).

When neither the retrieval of a table in which the corporate organization code coincides with the second corporate organization code nor the retrieval of a table in which the corporate organization name coincides with the second corporate organization name are successful (step S110; NO), the CPU 11 records a comment in a Remarks column of the distribution-target management table as an object for processing that the corporate organization code and the corporate organization name are not stored in the Personnel server 30 (step S112).

After the above processing, the CPU 11 determines whether the processing for all drawings is completed or not (step S113), and specifies a distribution-target management table for the next drawing (step S114) when it is determined that the processing is not completed (step S113; NO) Then, the CPU 11 returns the processing to step S102 and starts processing for the newly specified distribution-target management table.

Figure 7:
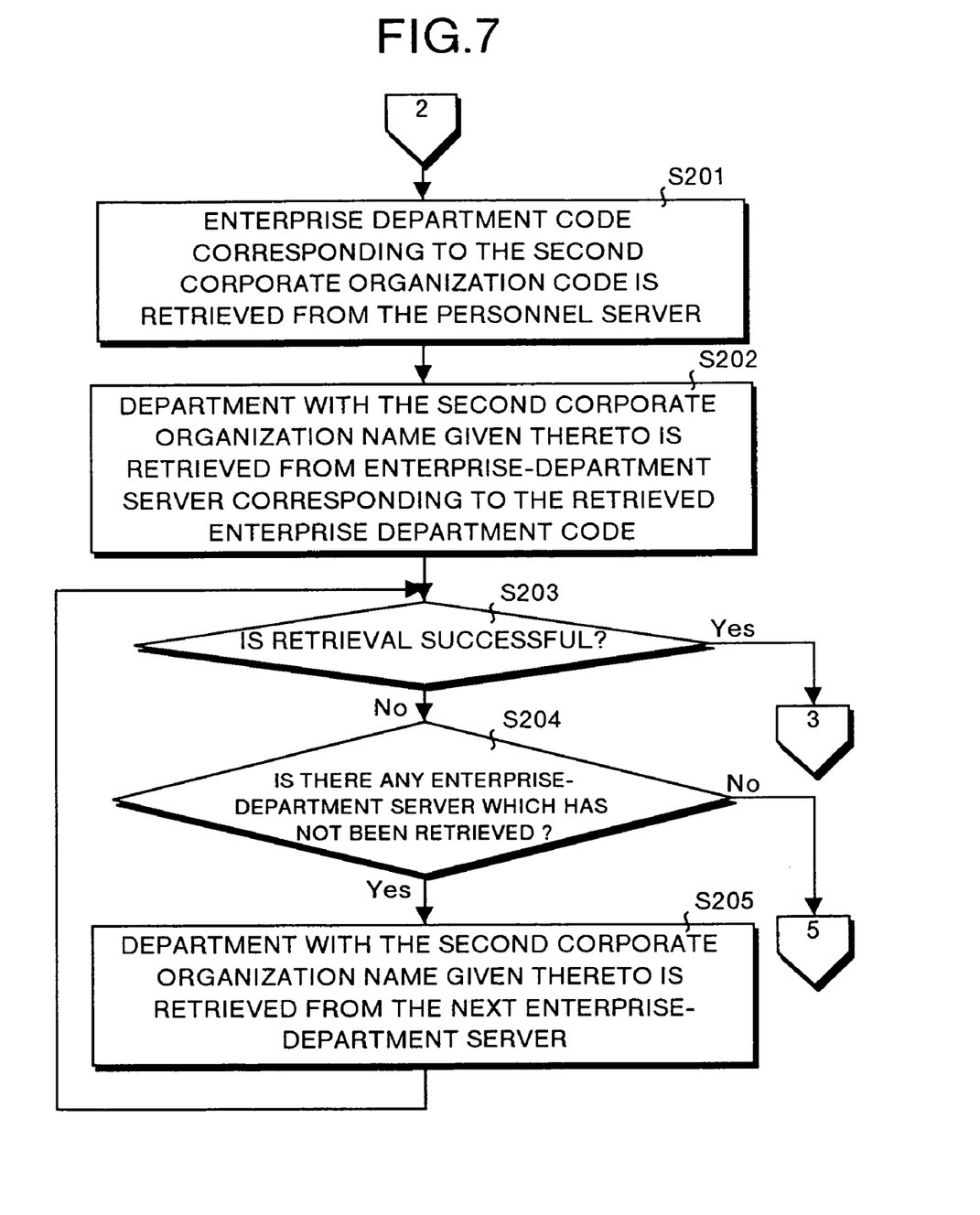
FIG. 7 is a flow chart showing the processing of checking the distribution-target management table executed in the document management apparatus according to the embodiment.

When tables including the corporate organization code and corporate organization name having the same contents as those of the corporate organization code and corporate organization name in the distribution-target management table as an object for processing exist in the Personnel server 30 (step S107; YES), and when retrieval is made for any table having only the corporate organization code coincident with that in the distribution-target management table as an object for processing and the corporate organization name in the table is stored as a second corporate organization name (step S108), or when retrieval is made for any table having only the corporate organization name coincident with that in the distribution-target management table as an object for processing and the corporate organization code in the table is stored as a second corporate organization code (step S111), the CPU 11 retrieves an Enterprise Department code corresponding to the second corporate organization code from the Personnel server 30 as shown in FIG. 7 (step S201).

Then, the CPU 11 retrieves any Department with the same corporate organization name as the second corporate organization name given thereto from the Enterprise-Department server 31 (Refer to FIG. 4) corresponding to the retrieved Enterprise Department code (step S202).

When the Department described above is failed to be retrieved (step S203; NO), the CPU 11 determines whether the retrieval for all the Enterprise-Department servers 31 is completed or not (step S204). Then, if it is determined that some of the Enterprise-Department servers 31 have not yet been retrieved (step S204; YES), the CPU 11 retrieves any Department with the same corporate organization name as the second corporate organization name given thereto from the next Enterprise-Department server 31 (step S205), and returns the processing to the step S203.

Figure 8:
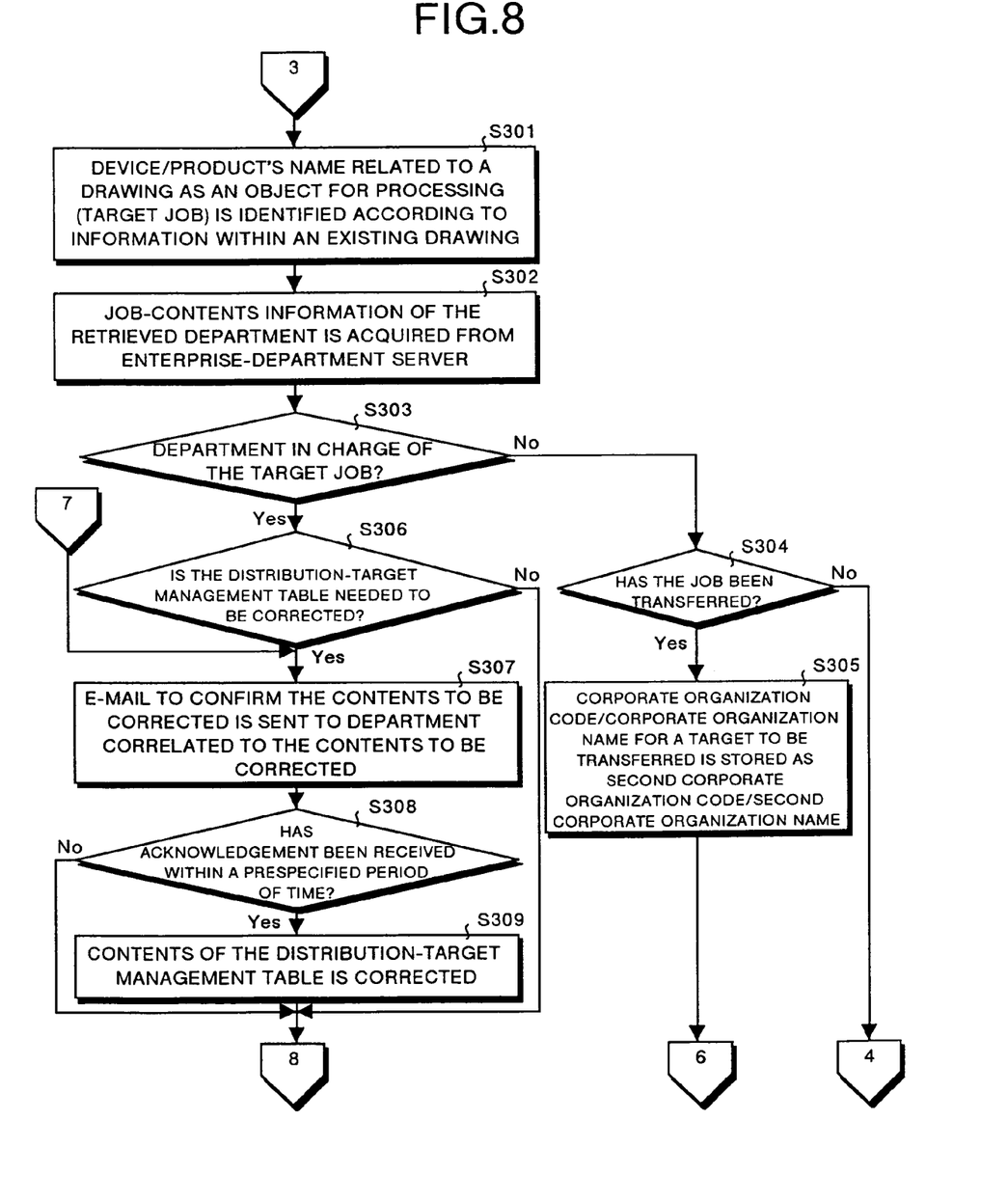
FIG. 8 is a flow chart showing the processing of checking the distribution-target management table executed in the document management apparatus according to the embodiment.

When the retrieval of the Department with the same corporate organization name as the second corporate organization name given thereto is successful (step S203; YES), the CPU 11 specifies, as shown in FIG. 8, a name of a device or a product's name related to the drawing as an object for processing at that point of time (expressed as target job) according to the drawing stored in the document management apparatus 10 (step S301).

Figure 9:
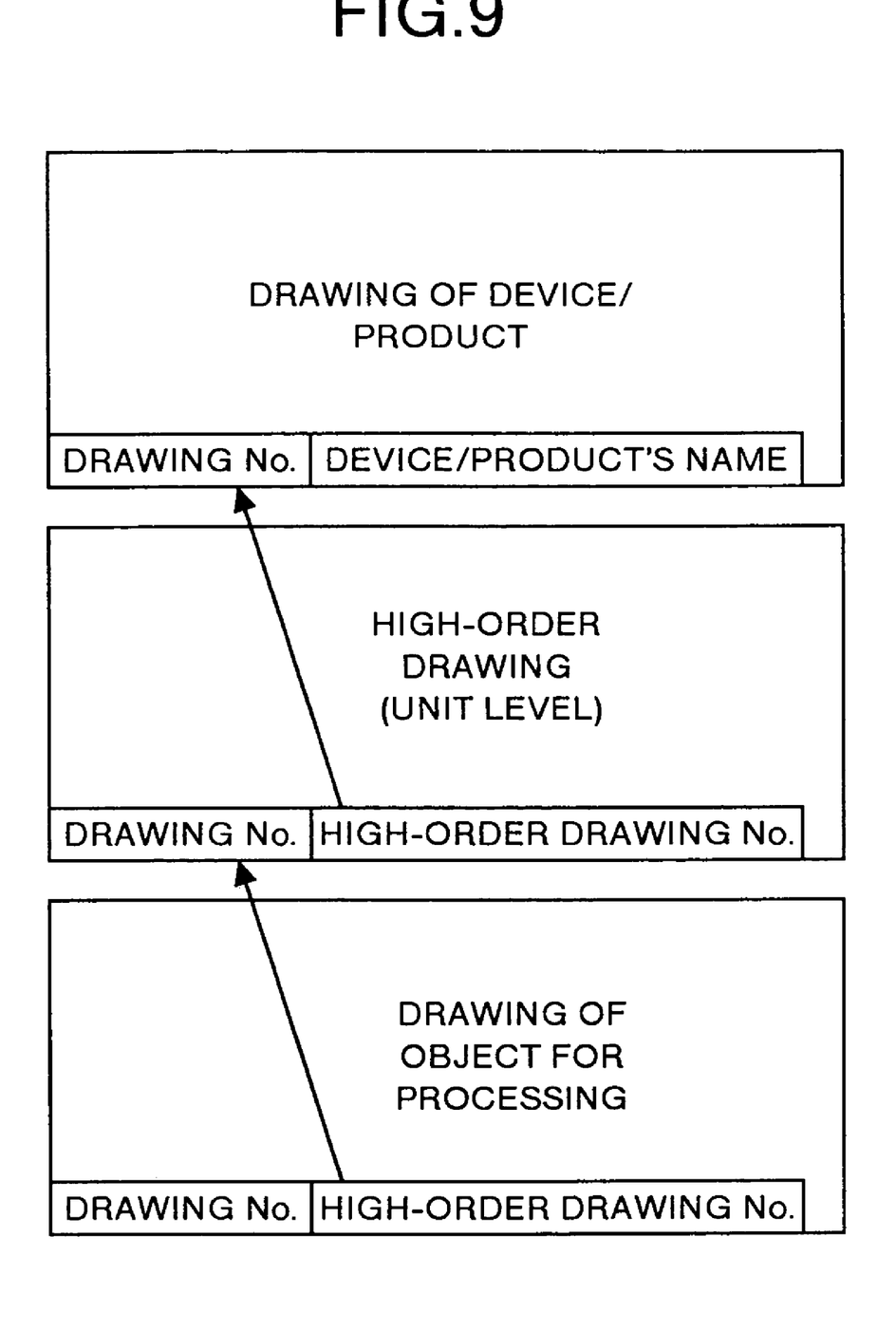
FIG. 9 is an explanatory view showing a relation between a drawing number and a device/product's name maintained by the document management apparatus according to the embodiment.

Specifically, in this step, the CPU 11 first acquires, as schematically shown in FIG. 9, a high-order drawing number included in a drawing as an object for processing, and further acquires a higher-order drawing number from the high-order drawing identified by the high-order drawing number. The CPU 11 repeats the processing described above until the target drawing number of the drawing for the device/product is acquired, and specifies the device/product's name (target job) for the drawing as an object for processing from the information included in the drawing identified by the drawing number.

Returning to FIG. 8, description for the processing of checking the distribution-target management table will be continued. After the target job of the drawing as an object for processing is specified (step S301), the CPU 11 acquires, from the Enterprise-Department server 31 in which the Department has been retrieved, job-contents information of the corresponding Department (step S302). Then, the CPU 11 determines whether the retrieved Department is a Department-in-charge of the target job or not using the acquired job-contents information (step S303). Namely, it is determined whether the job including the device/product name exists among jobs in each projects or not.

When it is determined that the retrieved Department is not a Department-in-charge of the target job (step S303; NO), the CPU 11 determines whether the job has been transferred or not (step S304). If the job has been transferred, the corporate organization code and corporate organization name is included in the job-contents information. Therefore, when the job has been transferred (step S304; YES), the CPU 11 stores therein the corporate organization code and corporate organization name of the target as the second corporate organization code and second corporate organization name respectively (step S305), and executes the processing in step S103 and thereafter in FIG. 6.

On the other hand, when the retrieved Department is the one in-charge of the target job (step S303; YES), the CPU 11 determines whether the contents of the distribution-target management table needs to be corrected or not (step S306). In this step, the CPU 11 determines that the content of the distribution-target management table needs to be corrected if the second corporate organization code is different from the corporate organization code in the distribution-target management table as an object for processing or if the second corporate organization name is different from the corporate organization name in the distribution-target management table.

When it is determined that the contents of the distribution-target management table needs to be corrected (step S306; YES), the CPU 11 sends an E-mail (electronic mail) to confirm the contents to be corrected to the Department correlated to the contents to be corrected (step S307). Then, when an E-mail on the acknowledgement is received from the corresponding Department within a prespecified period of time (step S308; YES), the CPU 11 corrects the contents of the distribution-target management table using the second corporate organization code and the second corporate organization name (step S309) and executes the processing in step S113 and thereafter (FIG. 6). Namely, the CPU 11 determines whether there is any drawing that has not been processed, and when it is determined that there is a drawing left unprocessed then starts the processing for that drawing.

When it is determined that the contents of the distribution-target management table as an object for processing need not be corrected (step S306; NO), the CPU 11 does not send the E-mail and executes the processing in step S113 and thereafter.

Then, when the acknowledgement is not received within the prespecified period of time (step S308; NO), the CPU 11 does not correct the distribution-target management table, and executes the processing in step S113 and thereafter. Namely, in this case, it is assumed that the information in the distribution-target management table conflicts with that in the Personnel server 30 or Enterprise-Department server 31. However, as the conflict between both of the information can not be confirmed, the processing of matching the information in the distribution-target management table with the information in the server is not executed until it is clearly confirmed.

Figure 10:
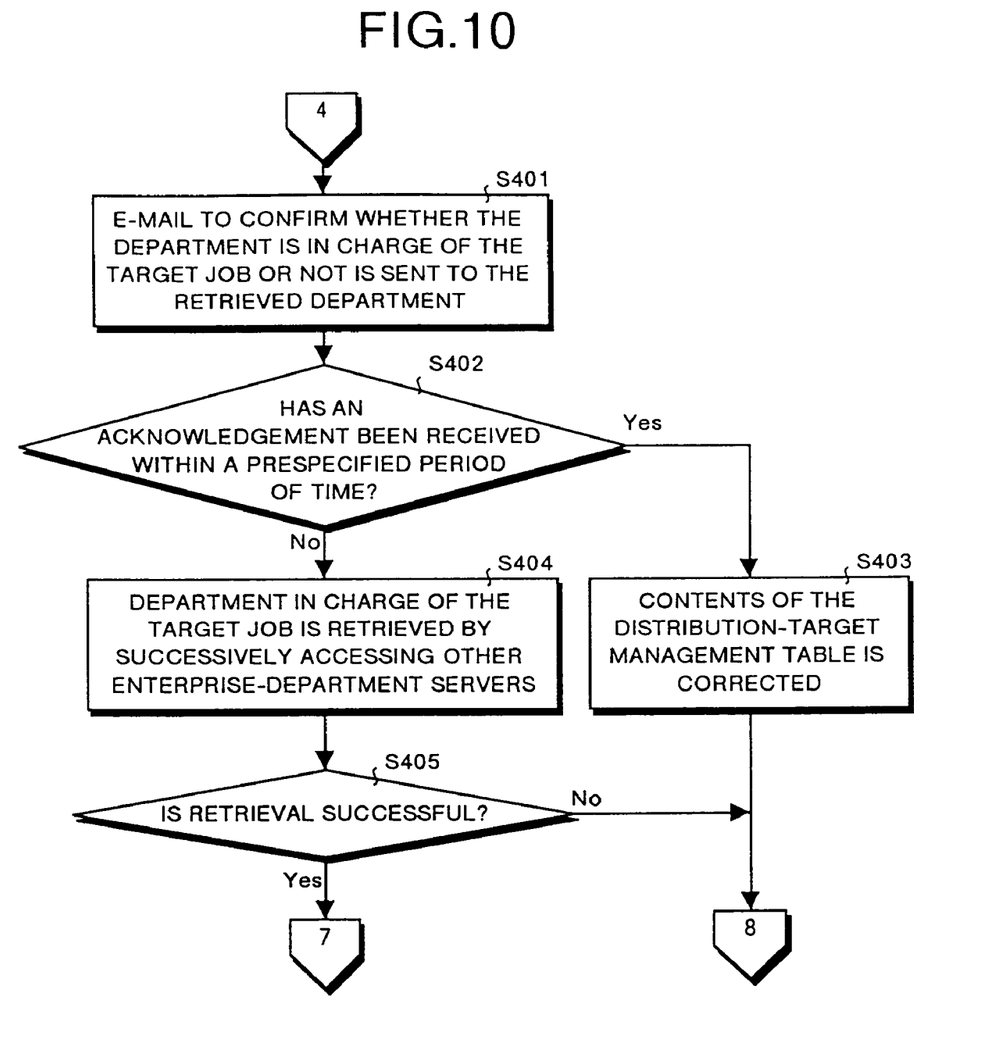
FIG. 10 is a flow chart showing the processing of checking the distribution-target management table executed in the document management apparatus according to the embodiment.

When it is determined that the retrieved Department is not the one in-charge of the target job or that the job has not been transferred (step S304; NO), the CPU 11 sends an E-mail to confirm whether the Department is in-charge of the target job or not to the retrieved Department as shown in FIG. 10 (step S401). Then, when the acknowledgement is received within the prespecified period of time (step S402; YES), the CPU 11 corrects the contents of the distribution-target management table as an object for processing (step S403) and executes the processing in step S113 and thereafter (FIG. 6).

On the other hand, when the acknowledgement is not received within the prespecified period of time (step S402; NO), the CPU 11 retrieves any Department-in-charge of the target job by successively accessing other Enterprise-Department servers 31 (step S404). Then, when the retrieval of the Department-in-charge of the target job is successful (step S405; YES), the CPU 11 executes the processing in step S307 and thereafter (FIG. 8). Namely, an E-mail to confirm the contents to be corrected is sent.

When the retrieval of the Department-in-charge of the target job is not successful (step S405; NO), the CPU 11 terminates the processing for the distribution-target management table as an object for processing, and executes the processing in step S113 and thereafter (FIG. 6).

Figure 11:
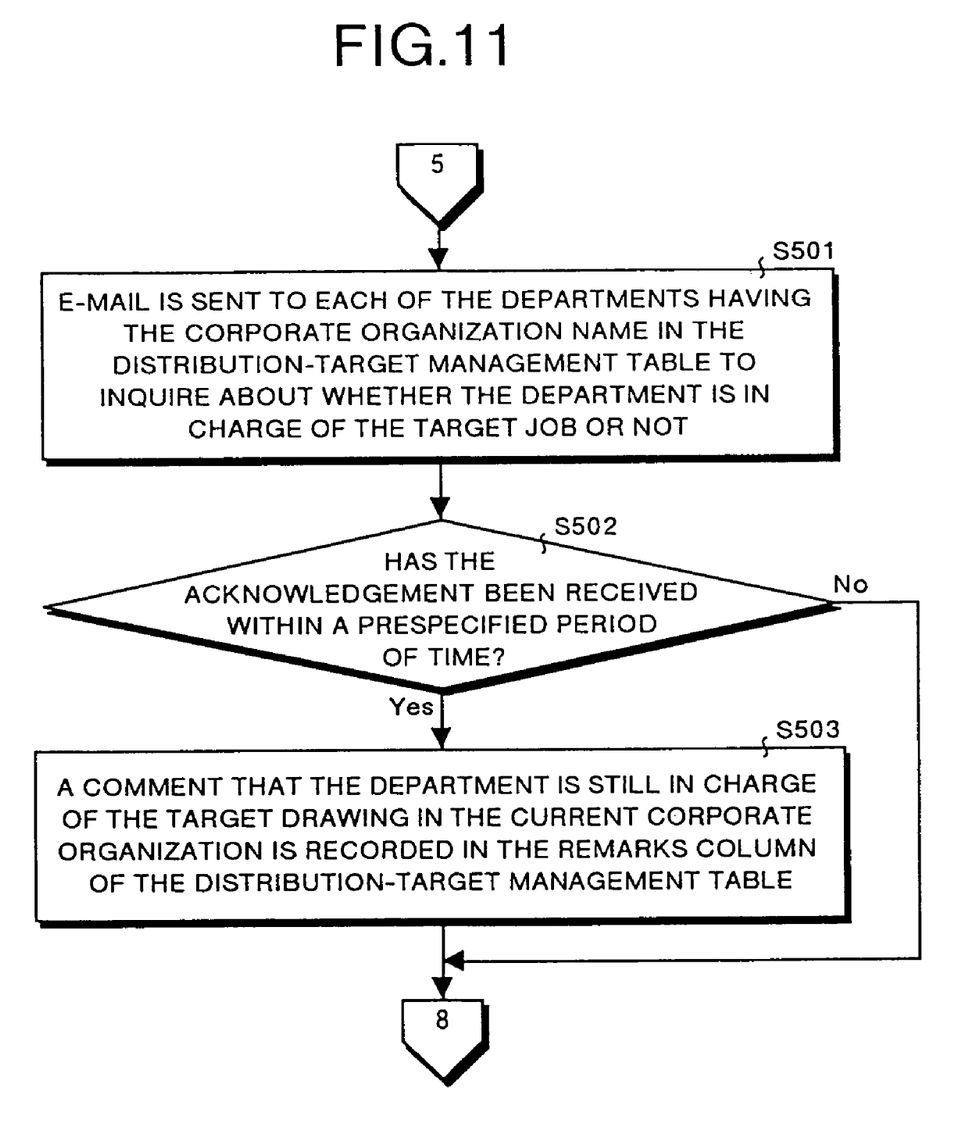
FIG. 11 is a flow chart showing the processing of checking the distribution-target management table executed in the document management apparatus according to the embodiment.

When the Department with the same corporate organization name as the second corporate organization name given thereto is not stored in any of the Enterprise-Department servers 31 (FIG. 7: step S204; NO), as shown in FIG. 11, the CPU 11 sends an E-mail to inquire, to each of the Departments having the corporate organization name in the distribution-target management table, whether the Department is one in-charge of the target job or not (step S501).

Then, when the acknowledgement is received within the prespecified period of time (step S502; YES), the CPU 11 records a comment in the Remarks column of the distribution-target management table as an object for processing that the Department is still in-charge of the target drawing in the current corporate organization (step S503), and terminates the processing for the distribution-target management table (executes the processing in step S113 and thereafter (FIG. 6)). On the other hand, when the acknowledgement is not received within the prespecified period of time (step S502; NO), the CPU 11 does not correct the contents of the distribution-target management table and executes the processing in step S113 and thereafter.

The CPU 11 performs the processing described above for all the drawings, and ends the processing for checking the distribution-target management tables when the processing for all the drawings is completed (step S113; YES).

As described above, the document management apparatus 10 according to the embodiment can rewrite attribute information for a drawing in a distribution-target management table so that the attribute information does not conflict with the master information of attribute information stored in a Personnel server 30 or in an Enterprise-Department server 31. Accordingly, by using the document management apparatus 10 according to the present invention, the contents of the distribution-target management table can automatically be corrected to those under the current situation even if a corporate organization code or a corporate organization name has been changed or if a Department-in-charge of the job has been changed.

The document management apparatus 10 can be modified in various ways. For example, although the document management apparatus 10 has been described as an apparatus that waits for an acknowledgement within a prespecified period of time after an E-mail is sent, however, the document management apparatus 10 may be modified to an apparatus in which the processing for a distribution-target management table for a next drawing is started after an E-mail is sent, and the processing for an acknowledgement is executed with the processing what is called interrupt processing.

Furthermore, the document management apparatus 10 can be modified in such a way that the processing for sending an E-mail is not performed. Namely, the document management apparatus 10 can be so configured that, when it is found that there is a conflict between information in a distribution-target management table and information in a server, the information in the distribution-target management table is always rewritten so as not to conflict with the information in the server.

Furthermore, the document management apparatus 10 may be so configured that the processing for checking distribution-target management tables is not periodically executed but is executed when the execution is instructed. Also it is natural to use the document management apparatus 10 as a device for managing not distribution-target management tables but some other electronic documents.

Although the present invention has been described with respect to specific embodiments for a complete and clear disclosure, the appended claims are not be thus limited but are to be construed as embodying all modifications and alternative constructions that may occur to one skilled in the art which fairly fail within the basic teaching herein set forth.

As described above, with the present invention, it is possible to obtain a document management apparatus which can match, when master information has been changed, the contents of a document managed by a user with the changed master information, namely which can more accurately manage the documents.

With the present invention, it is possible to obtain a document management apparatus in which a document including corporate organization codes as well as corporate organization names as attribute information for managing targets to be distributed of a document as an object for distribution can be determined as an object for management, and information including one with corporate organization codes correlated to corporate organization names can be determined as master information.

With the present invention, it is possible to obtain a document management apparatus which is applicable to a generally used system with various information distributed to and managed by a Personnel server as well as by an Enterprise-Department servers.

With the present invention, correction of attribute information in a document can be notified to the corresponding Department, so that it is possible to obtain a document management apparatus enabling more accurate management of the documents.

With the present invention, it is possible to obtain a computer-readable recording medium with a computer program recorded therein for causing a computer work as the document management apparatus according to the present invention by installing a specified program into the computer using the program recorded medium.

This application is based on Japanese patent application No. HEI 10-209584 filed in the Japanese Patent Office on Jul. 24, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electronic multimedia object management apparatus for managing electronic multimedia objects related to jobs performed in corporate organizations and to be distributed to the corporate organizations, comprising:

a storage unit which stores the electronic multimedia objects and a plurality of distribution target management tables corresponding to the electronic multimedia objects, each distribution target management table including attribute information comprising at least a corporate organization code and a corporate organization name corresponding to a distribution target of the corresponding electronic multimedia object;

a communication unit in communication with a plurality of enterprise department servers and a master server, each enterprise department server managing at least one corporate organization and storing job information defining a job of the at least one corporate organization, the master server storing a plurality of master tables corresponding to the enterprise department servers, each master table including master attribute information comprising at least a master corporate organization code and a master corporate organization name of the at least one corporate organization man aged by the corresponding enterprise department server;

a processing unit which, according to a predetermined cycle, for each electronic multimedia object stored in the storage unit, reads the attribute information in the corresponding distribution target management table stored in the storage unit, and reads the master attribute information in the master tables stored in the master server through the communication unit, compares the corporate organization code and the corporate organization name of the read attribute information of the distribution target management table with the master corporate organization code and the master corporate organization name of the read master attribute information, retrieves from the enterprise department server corresponding to the master corporate organization code of the read master attribute information, through the communication unit, the job information defining the job of the at least one corporate organization stored in the enterprise department server, if determined that at least one of the corporate organization code and the corporate organization name of the read attribute information of the distribution target management table coincides with at least one of the master corporate organization code and the master corporate organization name of the read master attribute information, determines whether the job defined by the retrieved job information coincides with a job to which the electronic multimedia object relates; and rewrites the attribute information in the corresponding distribution target management table of the electronic multimedia object, if determined that the attribute information of the distribution target management table does not coincide with the master attribute information and that the retrieved job information coincides with the job to which the electronic multimedia object relates, by replacing one of the corporate organization code and the corporate organization name of the read attribute information included in the distribution target management table, which does not coincide with a respective one of the master corporate organization code and the master corporate organization name of the read master attribute information, with the respective one of the master corporate organization code and the master corporate organization name of the read master attribute information, such that the read attribute information in the distribution target management table of the electronic multimedia object coincides with the master attribute information, an electronic mail outputting unit which automatically outputs an electronic email to a corporate organization identified by the one of the master corporate organization code and the master corporate organization name as a target organization in distributing a multimedia object to confirm that the identified corporate organization is in charge of the target job described in the job information at the target organization, if said corporate organization is in charge of the target job, an email is outputted for confirming the contents of the distribution target management table to be corrected to the corresponding organization if determined that said contents need to be corrected, and said electronic mail outputting unit communicates to the processing unit to rewrite the attribute information in the corresponding distribution management table of the electronic multimedia object when a reply to this email is received within a predetermined period of time.

* * * * *

UNITED STATES PATENT AND TRADEMARK OFFICE
CERTIFICATE OF CORRECTION

| | | |
|---|---|---|
| PATENT NO. | : 7,152,208 B2 | Page 1 of 1 |
| APPLICATION NO. | : 09/222833 | |
| DATED | : December 19, 2006 | |
| INVENTOR(S) | : Tadashi Ohashi | |

It is certified that error appears in the above-identified patent and that said Letters Patent is hereby corrected as shown below:

Column 9, Line 60, change "man aged" to --managed--.

Signed and Sealed this

Seventeenth Day of April, 2007

JON W. DUDAS
*Director of the United States Patent and Trademark Office*